April 11, 1967   M. B. NORTHRUP   3,313,496
REEL HUB
Filed Aug. 30, 1965   2 Sheets-Sheet 2

INVENTOR.
MALCOLM B. NORTHRUP
BY Moody & Hallaher
ATTORNEYS

United States Patent Office 3,313,496
Patented Apr. 11, 1967

3,313,496
REEL HUB
Malcolm B. Northrup, Cedar Rapids, Iowa, assignor to Collins Radio Company, Cedar Rapids, Iowa, a corporation of Iowa
Filed Aug. 30, 1965, Ser. No. 483,496
4 Claims. (Cl. 242—68.3)

This invention relates to an expandable hub mechanism useful in holding tape or film reels securely to a rotating shaft.

Many instruments, such as computers, tape decks and motion picture projectors utilize a reel of tape or film in their operation. The usual design of such devices comprises a hub which is mounted on a rotating shaft. The reel is provided with a central hole through which the hub is received. A fastening means is then employed to enable the reel to rotate with the hub. As the tape, or film, reaches an end, or for many other reasons, it frequently becomes necessary to change the reels. Also because in most instruments the speed of rotation is critical, it is necessary to apply a sufficient force to insure that the reel rotates uniformly with the hub. At the same time it is desirable to be able to change the reels in a minimum time period and with a minimum of effort and motion on the part of the attendant.

Many prior art devices for changing such reels suffer the disadvantage of requiring a fairly long period of time to effect the change because the removal or turning of bolts or screws is frequently necessary. Also these devices have the disadvantage of having an unreliable or unknown tension applied to the rim of the reel and therefore said rims are frequently mutilated and damaged. Consequently, there has long existed in the art the need for a mechanism which permits the rapid change of such reels with the minimum of movement and effort by the attendant while at the same time applying a known and controlled holding force to the reel.

It is therefore an object of this invention to provide an expandable hub;

It is another object of this invention to provide such a device which requires a minimum of movement by the operator;

It is another object to provide such a device which applies a known and uniform holding force to the interior rim of the reel and therefore minimizes the chance for mutilating or marring said reel.

Figure 1:
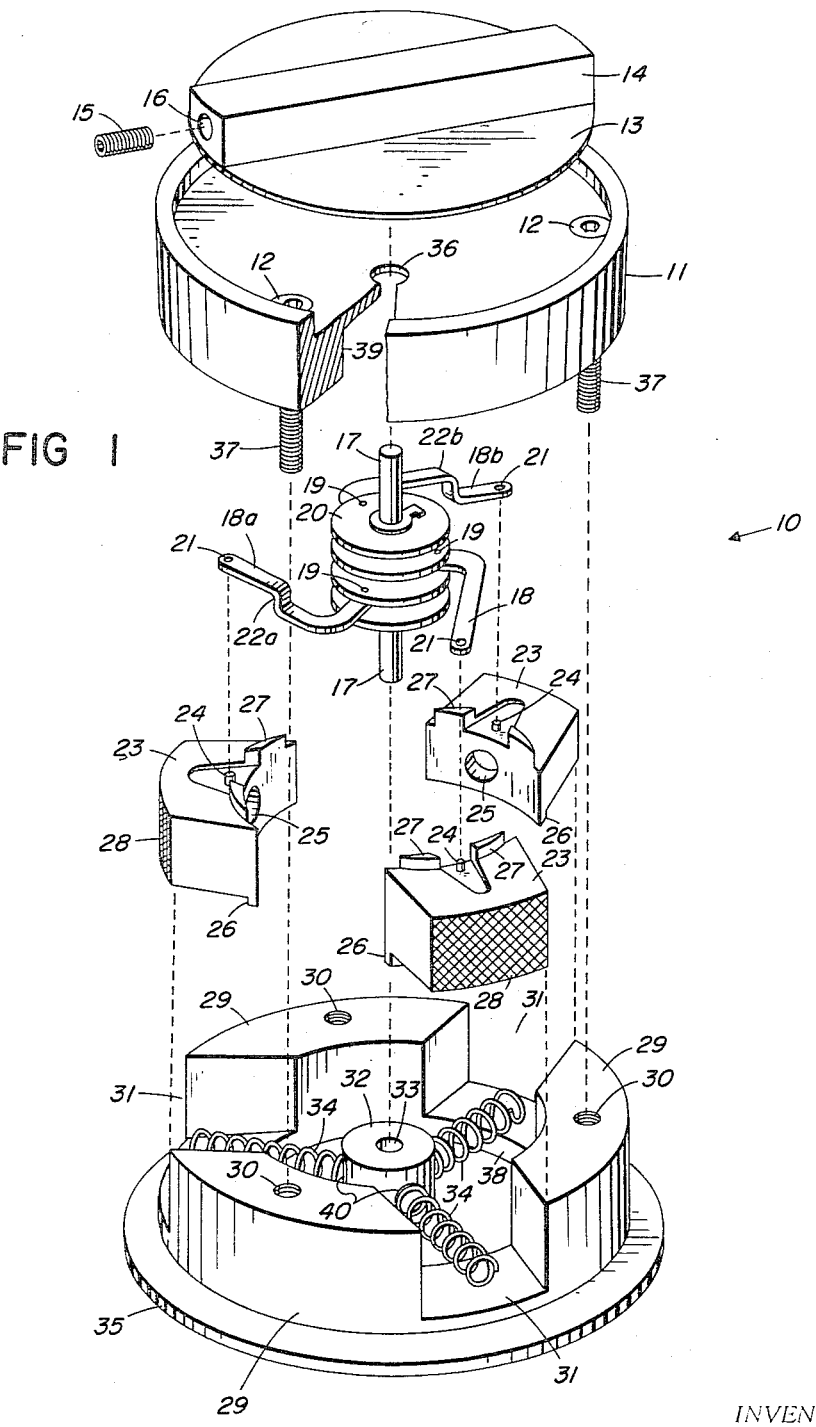
Figure 2:
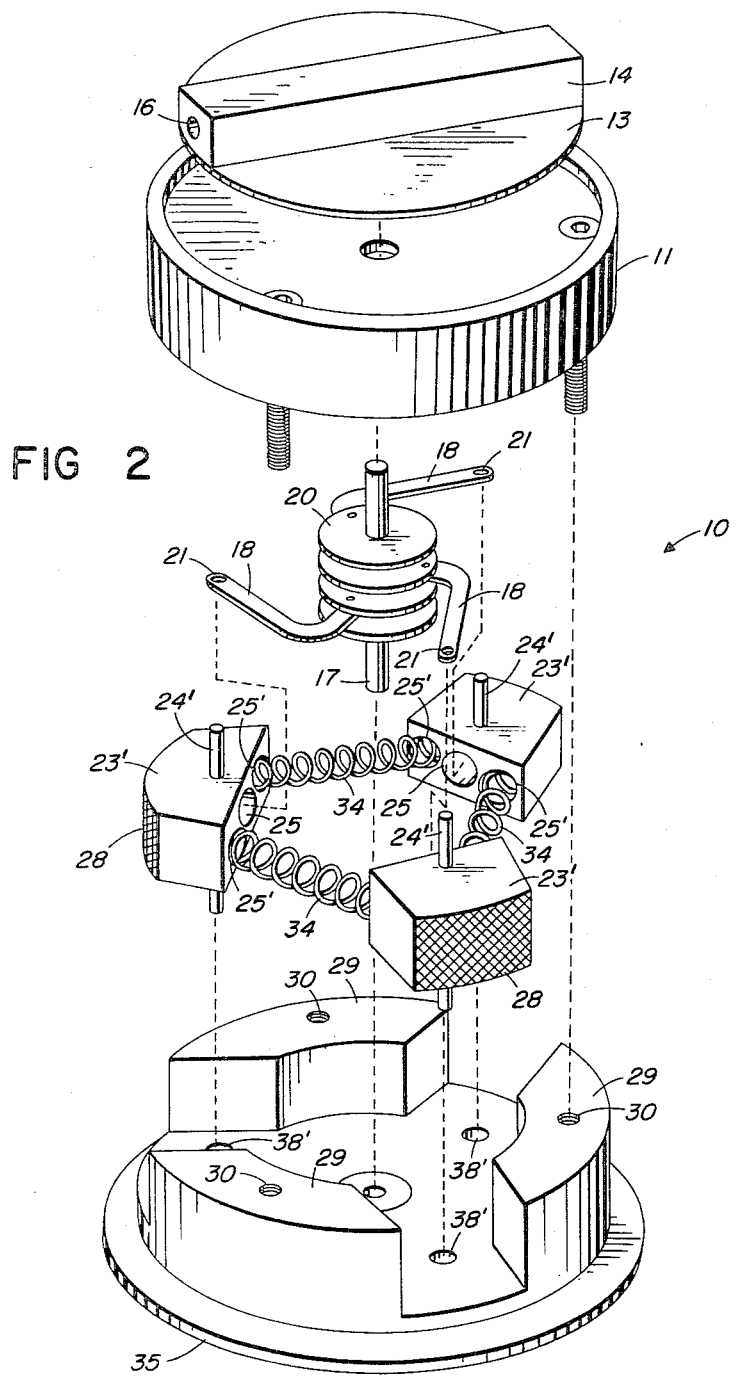

Further objects, features and advantages of the invention will become apparent from the following description and claims when read in view of the accompanying drawings, in which like numbers indicate like parts and wherein:

FIGURE 1 shows an exploded view of an expandable hub mechanism 10 which is one embodiment of the inventive device. FIGURE 2 shows a second embodiment of the inventive device.

A cover 11 containing a plurality of holes 12 through which mounting screws 37 extend is shown at the top of FIGURE 1. Also shown is a cover 13 having a handle, or similar turning means 14 rigidly connected thereto. Turning means 14 contains a hole (not shown) which is in axial alignment with hole 36 contained in cover 11. A second hole 16 running along the longitudinal axis of handle 14 is threaded to receive a set screw 15. Shaft 17 is receivable in hole 36 and the concealed hole contained in handle 14. By turning set screw 15 to apply pressure against shaft 17 a torque applied to handle 14 results in a turning motion of shaft 17. Rigidly attached to shaft 17 is a plurality of equally spaced disks 20. Pivotally attached to said disks 20 is a plurality of turning arms 18, 18a and 18b. These turning arms are spaced at intervals of 120° around the center of shaft 17. Turning arm 18a contains an upward turn 22a such that hole 21 in the end of turning arm 18a lies in the same plane as hole 21 of turning arm 18. Turning arm 18b contains a downward bend 22b such that hole 21 of arm 18b also lies in the same plane as hole 21 of arm 18. It is therefore evident that the outermost ends of turning arms 18, 18a, and 18b lie in the same plane. Holes 21 of the three turning arms receive pins 24 which are rigidly attached to pressure pads 23. Pressure pads 23 are receivable in slots 31 which are provided between base pads 29 mounted on base 35. The pressure pads are dimensioned such that they are freely slidable within slots 31. However, they are provided with stops 26 which engage ridge 38 of base 35. The pressure pads are also provided with stops 27 which engage ridge 39 of the top cover 11. Because of the presence of stops 26 and 27 acting against ridges 38 and 39, respectively, the movement of the pressure pads 23 along the radii of base 39 is limited and is assured of a fixed mechanical stop. Resting in holes 40 of support 32 are a series of springs 34. These springs also engage holes 25 of the pressure pads 23 and therefore bias them outwardly. The lower end of shaft 17 is rotatably received in hole 33 of support 32. With the device assembled, as indicated by the broken lines in the exploded view of the figure, a turning force on handle 14 causes rotation of shaft 17 and disks 20. This turning force is applied through arms 18, 18a, and 18b to the three pressure pads 23 to push said pads outwardly away from support 32. This causes the rubber faces 28 of the metal pressure pads 23 to extend beyond the outer surfaces of the base pieces 29. With the pressure pads in this position, the faces 28 will act against the interior diameter of a reel. The action of springs 34 will cause a uniform pressure to be applied to said reel and permit it to rotate along with the hub mechanism 10. When it is desired to remove the reel from the hub it is merely necessary to turn handle 14 counterclockwise which causes arms 18 to retract pressure pads 23 inwardly against the spring action of springs 34. This permits easy removal of the reel from the hub mechanism 10. It is therefore evident that simply by turning handle 14 either clockwise or counterclockwise approximately 30° a new reel can easily and simply be placed upon the hub mechanism with the minimum of a workman's movements and without scarring the interior of the rim. The pulling forces which retract pressure pads 23 act along the radii of base 35. This causes the center of force of the device to pass through its physical center. Also because turning arms 18, 18a, and 18b have a curved motion a mechanical advantage is obtained. For these reasons a toggle action is obtained and a small force applied to handle 14 is sufficient to actuate the device from one position to another. The over center toggle action is increased by wear of the elements and therefore the device also has the advantage of eliminating problems caused by such wear. The device also has the advantage of interchangeability of parts.

Although the use of three pressure pads 23 is shown, the device can be made with any number in excess of one.

FIGURE 2 shows a second embodiment of the inventive device. This embodiment is similar to the embodiment of FIGURE 1 except for changes in pressure pads 23, lever arms 18, 18a, and 18b, and the arrangement of springs 34. Pressure pads 23' are now provided with a pair of holes 25'. The holes 25' are cut at an angle so that each spring 34 is mounted between two pressure pads 23' as shown. This arrangement of springs 34 results in a resultant force through the center of the pressure pads and therefore centers the pads between guides 29. Pin 24', of each pressure pad, is long and extends through the pad. A plurality of holes 38' is provided in base 35. A second plurality of holes (not shown) is also provided in cover 11. These holes receive the ends of pins 24' and are of sufficient diameter to allow the pins to move transversely between guides 29. The hole and pin arrangement therefore eliminates the need for stop surfaces 38 and 39 and also stops 26 and 27. Holes 25 in the pads 23' accepts lever arms 18 without the need for turns 22a and 22b as shown in FIGURE 1. Pins 24' extend through the holes 25' to hold lever arms via holes 21 in the arms. The lever arms now act at the center line of the pressure pad allowing better alignment during operation. This is also advantageous because lever arms 18 are now completely interchangeable.

Although this invention has been described with respect to a particular embodiment thereof, it is not to be so limited, as changes and modifications may be made therein which are within the spirit and scope of the invention as defined by the appended claims.

I claim:

1. An expandable hub comprising: a base and a base cover, guide means associated with said base, a shaft rotatably supported between said base and said base cover, turning means connected to one end of said shaft, a plurality of pressure means associated with said guide means, stop means on said base and said base cover to limit the movement of said pressure means, means for biasing said pressure means outwardly from the center of said base, and a plurality of arms rotatably associated with said pressure means and said shaft for pivotally associating said pressure means with said shaft so that rotation of said shaft causes said pressure means to move in said guide means, the plurality of arms being the same as the plurality of pressure means.

2. The device of claim 1 wherein said guide means are slots formed between arcuate members rigidly associated with said base.

3. The device of claim 1 wherein said means pivotally associating said pressure means and said shaft comprises a plurality of equally spaced flat members rigidly attached to said shaft, and a plurality of arms pivotally connected to said flat members and to said pressure means, said arms each having a bend in the plane normal to the axis of said shaft.

4. The device of claim 2 wherein said pressure means pivotally associating said pressure means and said shaft comprises a plurality of flat members rigidly attached to said shaft, and a plurality of arms pivotally connected to said flat members and to said pressure means, said arms each having a bend in the plate normal to the axis of said shaft.

References Cited by the Examiner

UNITED STATES PATENTS

| | | | |
|---|---|---|---|
| 2,381,301 | 8/1945 | Markle | 242—72 |
| 2,977,092 | 3/1961 | Duerksen | 242—72 X |
| 3,124,319 | 3/1964 | Cohen | 242—68 |

FRANK J. COHEN, *Primary Examiner.*

N. L. MINTZ, *Assistant Examiner.*